(12) United States Patent
Gallucci et al.

(10) Patent No.: US 8,357,773 B1
(45) Date of Patent: Jan. 22, 2013

(54) STEAM PURIFICATION OF POLYIMIDE RESINS

(75) Inventors: Robert R. Gallucci, Mt. Vernon, IN (US); Robert Hossan, Delmar, NY (US); Daniel F. Lowery, Mount Vernon, IN (US)

(73) Assignee: Sabic Innovative Plastics IP B.V., Bergen Op Zoom (NL)

( * ) Notice: Subject to any disclaimer, the term of this patent is extended or adjusted under 35 U.S.C. 154(b) by 0 days.

(21) Appl. No.: 13/286,161

(22) Filed: Oct. 31, 2011

(51) Int. Cl.
*C08G 64/00* (2006.01)
*C08G 63/02* (2006.01)

(52) U.S. Cl. ............... 528/480; 264/176.1; 264/219; 369/275.4; 428/64.2; 428/65.1

(58) Field of Classification Search ............ 264/176.1, 264/219; 369/275.4; 428/64.2, 65.1; 528/480, 528/481
See application file for complete search history.

(56) References Cited

U.S. PATENT DOCUMENTS

| | | | | |
|---|---|---|---|---|
| 7,314,907 B2 * | 1/2008 | Dong et al. | .................. | 528/480 |
| 7,354,990 B2 * | 4/2008 | Hossan et al. | ................ | 528/480 |
| 7,585,935 B2 * | 9/2009 | Hossan et al. | ................ | 528/480 |

* cited by examiner

*Primary Examiner* — Terressa Boykin
(74) *Attorney, Agent, or Firm* — Novak Druce + Quigg LLP; Diderico van Eyl

(57) ABSTRACT

The disclosure relates to a steam stripping process for producing purified polyimides, e.g., polyetherimide homopolymers and polyetherimide copolymers. The process can include contacting an initial polyimide with steam to remove a volatile species from the initial polyimide to produce a purified polyimide. The purified polyimide can have a weight average molecular weight of from 5,000 to 80,000 Daltons. The weight average molecular weight of the purified polyimide can be greater than or equal to 90% of the weight average molecular weight of the initial polyimide. The purified polyimide can have less than 44 ppm of a volatile species, having a molecular weight of less than 250 Daltons. The polyimide can have less than 10 ppm of a metal cation.

29 Claims, 1 Drawing Sheet

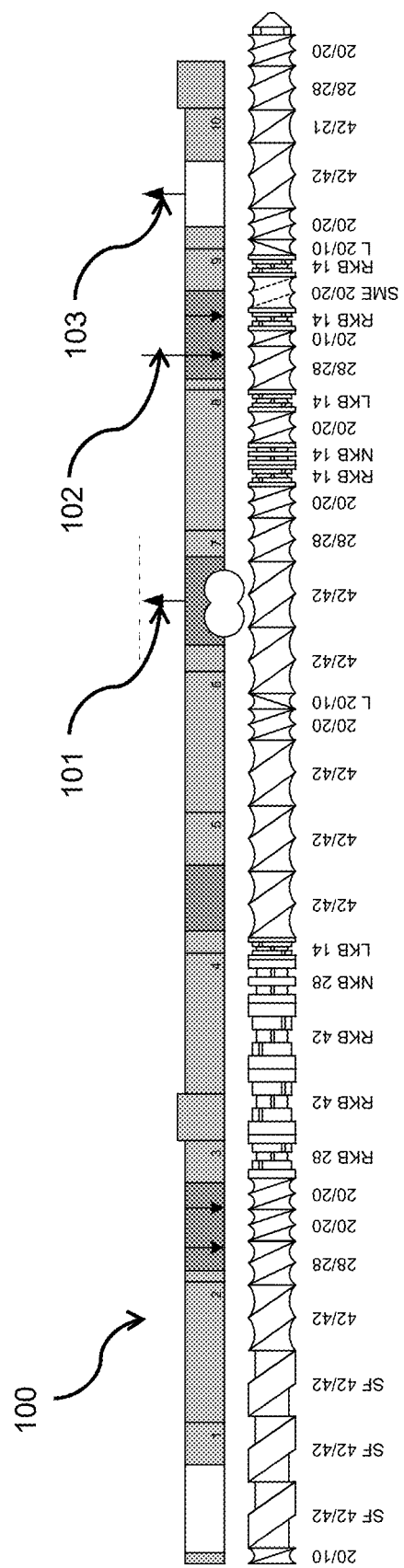

STEAM PURIFICATION OF POLYIMIDE RESINS

BACKGROUND OF THE INVENTION

Polyimides such as polyetherimides are well known engineering thermoplastics that can be made by condensation polymerization. See: ASTM: D5205-96 Standard Classification System for Polyetherimide (PEI) Materials. Many applications, such as electronics, medical, and food service, require polyetherimides having a higher purity than can be obtained by normal manufacturing.

BRIEF SUMMARY OF THE INVENTION

Various embodiments of the invention relate to the use of steam stripping in melt extrusion of polyimide resin. Embodiments lead to unexpected reduction in impurities such as: residual solvent, for instance halogenated solvent such as o-dichlorobenzene (oDCB) and phosphites. More specifically, it has been found that melt extrusion at 300 to 450° C. with the injection and subsequent removal of steam reduces impurities such as residual solvents and phosphite impurities in a rapid continuous process. Surprisingly the process does not result in any significant loss of molecular weight. The process can take less than 5 minutes, and usually often less than 1 minute.

One embodiment of the invention relates to a steam stripping process for producing a purified polyimide selected from the group of polyetherimide homopolymers, polyetherimide copolymers, and combinations thereof. The steam stripping process for producing a purified polyimide from an initial polyimide can include:
  a) melting the initial polyimide at above 300 degrees Celsius in an extruder to produce a molten polyimide;
  b) contacting the molten polyimide with steam for a time period less than or equal to 10 minutes;
  c) allowing the steam and any volatile species to escape from the extruder through a vent disposed thereon;
  d) passing the molten polyimide through a die to form the purified polyimide;
  e) cooling the purified polyimide to a temperature in a range less than or equal to a glass transition temperature of the purified polyimide; and
  f) chopping the purified polyimide into pellets,
The purified polyimide can have a weight average molecular weight that is in a range of from 5,000 to 80,000 Daltons. The weight average molecular weight of the purified polyetherimide can also be at least 90% of the weight average molecular weight of the initial polyetherimide.

Another embodiment of the invention relates to a polyimide having a weight average molecular weight of from 5,000 to 80,000 Daltons, having less than 44 ppm of a volatile species, and less than 13 ppm of phosphorous.

In another embodiment, the invention relates to a polyimide having a weight average molecular weight of from 5,000 to 80,000 Daltons,
wherein the polyetherimide is a purified polyimide and the polyimide comprises less than 44 ppm of a volatile species, the volatile species having a molecular weight of less than 250 Daltons and being selected from the group consisting of aryl compounds, aprotic polar compounds, and combinations thereof, and
wherein the polyimide comprises less than 13 ppm 37 ppm of phosphorous;
  wherein the polyimide is made by a steam stripping process comprising:
  a) melting the initial polyimide at above 300 degrees Celsius in an extruder to produce a molten polyimide;
  b) contacting the molten polyimide with steam for a time period less than or equal to 10 minutes;
  c) allowing the steam and any volatile species to escape from the extruder through a vent disposed thereon;
  d) passing the molten polyimide through a die to form the purified polyimide;
  e) cooling the purified polyimide to a temperature in a range less than or equal to a glass transition temperature of the purified polyimide; and
  f) chopping the purified polyimide into pellets,
wherein the purified polyimide has a weight average molecular weight that is in a range of from 5,000 to 80,000 Daltons, and that is at least 90% of the weight average molecular weight of the initial polyimide.

In another embodiment, the invention relates to a process comprising contacting an initial polyimide with steam to remove a volatile species from the initial polyimide to produce a purified polyimide, the volatile species selected from the group of aryl compounds, aprotic polar compound, and combinations thereof, said aryl compounds selected from the group consisting of toluene, xylenes, naphthalene, chloro benzene, dichlorobenzenes, trichlorobenzenes, anisole, veratrole, cresols, phenol, xylenols, diphenyl sulfones, diphenyl ethers, benzonitrile, and combinations thereof, said aprotic polar compound being selected from the group consisting of dimethyl formamide, N-methylpyrrolidinone, dimethyl sulfoxide, formamide, sulfolane, acetamide, and combinations thereof;
  wherein the purified polyimide has a weight average molecular weight of from 5,000 to 80,000 Daltons, and
  wherein the weight average molecular weight of the purified polyimide is greater than or equal to 90% of the weight average molecular weight of the initial polyimide;
  wherein the polyimide has less than 10 ppm of a metal selected from the group consisting of aluminum, calcium, chromium, copper, iron, magnesium, sodium, nickel, silicon, titanium, zinc, and combinations thereof; and
  the polyimide has less than 20 ppm of an anion selected from the group consisting of chloride, bromide, sulfates, phosphates, and combinations thereof.

The particular volatile species can be a volatile species having a molecular weight of less than 250 Daltons and being selected from the group consisting of aryl compounds, aprotic polar compounds, and combinations thereof. In other instances the volatile species n can have a molecular weight of less than 650 Daltons and being selected from the group consisting of phosphates, phosphites, and combinations thereof. The polyimide can have a glass transition temperature (Tg) in a range of from 200 to 280 degrees Celsius. The polyimide can have a polydispersity index (PDI) of less than or equal to 2.5. The polyimide can have a phenolic end group concentration below 40 ppm. The polyimide can have less than 10 ppm of a metal selected from the group consisting of aluminum, calcium, chromium, copper, iron, magnesium, sodium, nickel, silicon, titanium, zinc, and combinations thereof. The polyimide can have less than 20 ppm of an anion selected from the group consisting of chloride, bromide, sulfates, phosphates, and combinations thereof.

These and other features, aspects, and advantages of the present invention will become better understood with reference to the following description and appended claims.

BRIEF DESCRIPTION OF THE DRAWINGS

These and other features, aspects, and advantages of the present invention will become better understood with refer-

DETAILED DESCRIPTION OF THE INVENTION

Our invention is based on the remarkable discovery that by subjecting a molten polyimide, e.g., polyetherimide to certain steam conditions, subjecting molten polyetherimides to steam stripping conditions can result in a polymer that exhibits a combination of both low residual amounts and excellent molecular weight retention. Surprisingly, the polyetherimide polymer made with our process, does not undergo chain scission to lose appreciable molecular weight, as is often observed with polyetherimide is exposed to water/steam and high temperatures The present invention may be understood more readily by reference to the following detailed description of preferred embodiments of the invention as well as to the examples included therein. In the following detailed description and in the claims which follow, reference will be made to a number of terms which shall be defined to have the following meanings:

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

The term "polyimide," as used in this application can mean polyetherimides (polyetherimide homopolymers) or polyetherimide copolymers, e.g., polyetherimide sulfones. Polyimides are known polymers and are sold by SABIC Innovative Plastics under the Ultem*, Extem*, and Siltem* brands (Trademark of SABIC Innovative Plastics IP B.V.).

More particularly, the polyimide can be selected from polyetherimides (polyetherimide homopolymers), siloxane-polyetherimides, polyetherimide sulfones, and combinations thereof.

The polyetherimides are of formula (1):

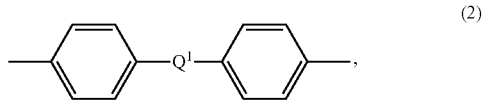

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

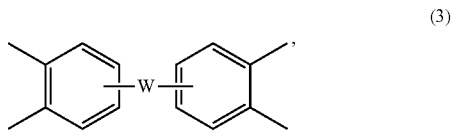

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3):

(3)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

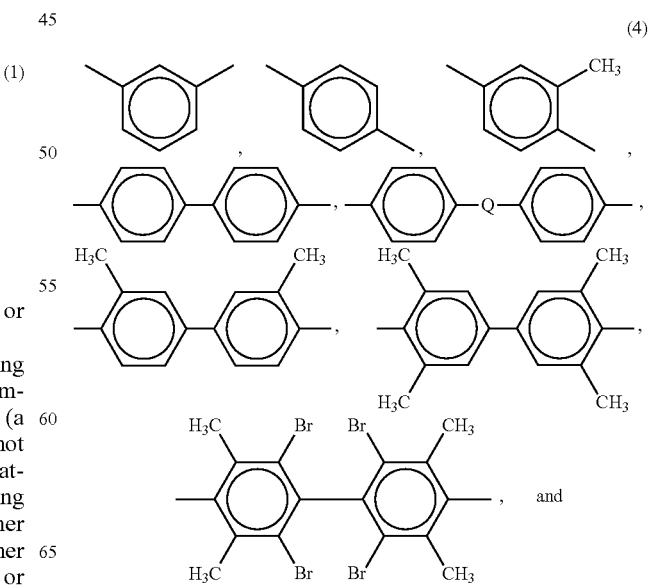

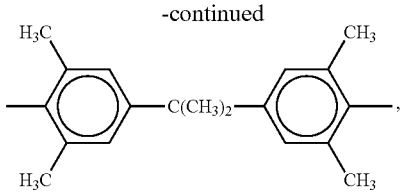

wherein Q includes, but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

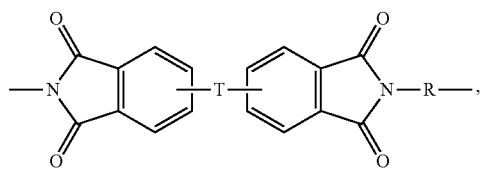

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6):

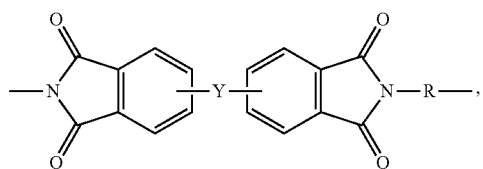

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO$_2$— groups.

It is to be understood that the polyetherimides and polyetherimide sulfones can optionally comprise linkers V that do not contain ether or ether and sulfone groups, for example linkers of formula (7):

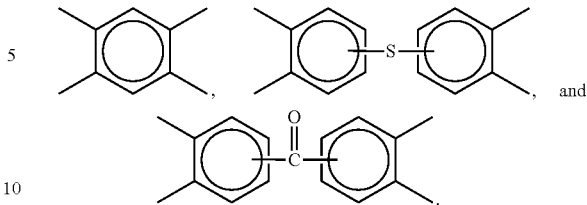

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of a bis(phthalimide) for formula (8):

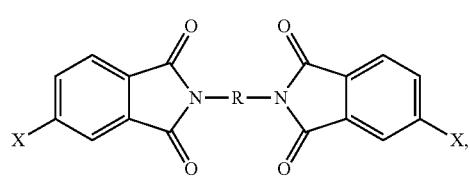

wherein R is as described above and X is a nitro group or a halogen. Bis-phthalimides (8) can be formed, for example, by the condensation of the corresponding anhydride of formula (9):

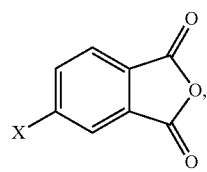

wherein X is a nitro group or halogen, with an organic diamine of the formula (10):

wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2- dimethylpropylenediamine, N-methyl-bis (3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl) toluene, bis(p-b-amino-t-butylphenyl)ether, bis(p-b-methyl-o-aminophenyl) benzene, bis(p-b-methyl-o-aminopentyl)benzene, 1,3-diamino-4-isopropylbenzene, bis(4-aminophenyl)ether and 1,3-bis(3-aminopropyl) tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl)sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination. In one embodiment, only the polyetherimide is used. In another embodiment, the weight ratio of polyetherimide: polyetherimide sulfone can be from 99:1 to 50:50.

The polyimides can have a weight average molecular weight (Mw) of 5,000 to 100,000 grams per mole (g/mole) as measured by gel permeation chromatography (GPC). In some embodiments the Mw can be 10,000 to 80,000.

The molecular weights as used herein refer to the absolute weight averaged molecular weight (Mw).

The polyimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyimides can have a glass transition temperature of greater than 180° C., specifically of 200° C. to 400° C., as measured using differential scanning calorimetry (DSC) per ASTM test D3418. In some embodiments the polyimide, an in particular a polyetherimide has a glass transition temperature of 240 to 350° C.

The polyimides can have a melt index of 0.1 to 10 grams per minute (g/min), as measured by American Society for Testing Materials (ASTM) DI238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischloro phthalimide of meta-phenylene diamine (CAS No. 148935-94-8). The bischloro phthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischloro phthalimides which may be polymerized by chloro-displacement with BPA disodium salt as described above.

Siloxane polyetherimides can include polysiloxane/polyimide block copolymers having a siloxane content of greater than 0 and less than 40 weight percent (wt %) based on the total weight of the block copolymer. The block copolymer comprises a siloxane block of Formula (1):

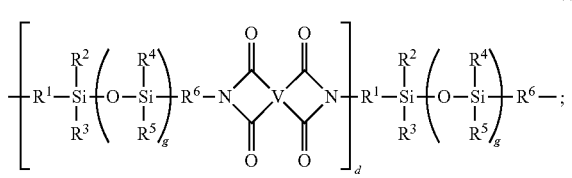

(I)

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (Trademark of SABIC Innovative Plastics IP B.V.)

The polyimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyimide resin can have a weight average molecular weight (Mw) from 5,000 to 100,000 daltons, from 5,000 to 80,000 daltons, or from 5,000 to 70,000 daltons.

A process according to various embodiments can include contacting an initial polyetherimide with steam to remove a volatile species from the initial polyetherimide to produce a purified polyetherimide. The initial polyetherimide can be in a molten state during the contacting with steam.

The process can involve melting initial polyetherimide at a melting temperature in an extruder to produce a molten polyetherimide. The melting temperature can be within a range having a lower limit and/or an upper limit, each expressed in degrees Celsius. The range can include or exclude the lower limit and/or the upper limit. The melting temperature lower limit and/or upper limit can be selected from 250, 275, 300, 325, 350, 400 and 410 degrees Celsius. For example, the melting temperature can be above 300 degrees Celsius.

The process can involve contacting the molten polyetherimide or other polyimide with steam for a contacting time. The contacting time can be a time period within a range having a lower limit and/or an upper limit, each expressed in minutes. The range can include or exclude the lower limit and/or the upper limit. The contacting time lower limit and/or upper limit can be selected from 60, 45, 30, 25, 20, 15, 10, 9, 8, 7, 6, 5, 4, 3, 2, 1, 0.9, 0.8, 0.7, 0.6, 0.5, 0.4, 0.3, and 0.1 minutes. For example, the contacting time can be less than or equal to 10 minutes.

The process can involve allowing the steam and any volatile species to escape from the extruder through a vent disposed thereon;

The process can involve passing the purified polyetherimide or other polyimide in a molten state through a filter to remove particles having a particle size. The particle size can be within a range having a lower limit and/or an upper limit, each expressed in microns. The range can include or exclude the lower limit and/or the upper limit. The particle size lower limit and/or upper limit can be selected from 20, 30, 40, 50, 60, 70, 75, 80, 85, 90, and 100 microns. For example, the particle size can be of at least 80 microns. In another embodiment the particle size is less than or equal to 80 microns. For example the particle size can range from 20 to 80 microns.

The process can involve passing the molten polyimide through a die to form the purified polyetherimide.

The process can involve cooling the purified polyimide to a temperature in a range less than or equal to a glass transition temperature (Tg) of the purified polyetherimide. The Tg of the purified polyimide can be within a range having a lower limit and/or an upper limit, each expressed in degrees Celsius. The range can include or exclude the lower limit and/or the upper limit. The Tg lower limit and/or upper limit can be selected from 180, 185, 190, 195, 200, 205, 210, 215, 220, 225, 230, 235, 240, 245, 250, 255, 260, 265, 270, 275, 280, 285, 290, 295, and 300 degrees Celsius. For example, the Tg of the purified polyimide can be in a range of from 200 to 280 degrees Celsius.

The process can involve chopping the purified polyimide into pellets.

The amount of o-dichlorobenzene or other aryl halogenated solvent in the purified polyimide can be within a range having a lower limit and/or an upper limit, each expressed in ppm. The range can include or exclude the lower limit and/or the upper limit. The lower limit and/or upper limit can be selected from 5, 10, 15, 20, 25, 30, 35, 40, 45, and 50 ppm. For example, the purified polyetherimide can have less than 20 ppm of o-dichlorobenzene. In other instances the polyimide can have no detectable halogenated solvent such as o-dichlorobenzene.

The weight average molecular weight (Mw) of the purified polyetherimide can be within a range having a lower limit and/or an upper limit, each expressed in Daltons. The range can include or exclude the lower limit and/or the upper limit. The lower limit and/or upper limit can be selected from 5000, 10000, 15000, 20000, 25000, 30000, 35000, 40000, 45000, 50000, 55000, 60000, 65000, 70000, 75000, 80000, 85000, 90000, 95000, and 100000 Daltons. For example, the purified polyetherimide can have a weight average molecular weight of from 5,000 to 80,000 Daltons. Polyetherimides are described, for example, in U.S. Pat. Nos. 3,875,116; 6,919, 422 and 6,355,723 as well as ASTM D5205.

The retention of the weight average molecular weight (Mw) of the purified polyetherimide can be a percentage of the weight average molecular weight of the initial polyetherimide. The percentage can be within a range having a lower limit and/or an upper limit. The range can include or exclude the lower limit and/or the upper limit. The lower limit and/or upper limit can be selected from 70, 75, 80, 81, 82, 83, 84, 85, 86, 87, 88, 89, 90, 91, 92, 93, 94, 95, 96, 97, 98, 99, and 100 percent. For example, the weight average molecular weight of the purified polyetherimide can be greater than or equal to 90% of the weight average molecular weight of the initial polyetherimide.

The purified polyetherimide can have a molecular weight polydispersity index within a range having a lower limit and/or an upper limit. The range can include or exclude the lower limit and/or the upper limit. The lower limit and/or upper limit can be selected from 0.5, 1, 1.5, 2, 2.5, 3, 3.5, 4, 4.5, 5, 5.5, 6, 6.5, 7, 7.5, 8, 8.5, 9, 9.5, and 10. For example, the purified polyetherimide can have a polydispersity index (PDI) of less than or equal to 2.5. The PDI is the ratio of the weight average molecular weight (Mw) to the number average molecular weight (Mn).

The purified polyetherimide can have a phenolic end group concentration within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, and 60 ppm. For example, the purified polyetherimide can have a phenolic end group concentration below 40 ppm.

The purified polyimide can have an amount of a metal selected from the group consisting of aluminum, calcium, chromium, copper, iron, magnesium, sodium, nickel, silicon, titanium, zinc, and combinations thereof, wherein the amount is within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 ppm. For example, the purified polyimide can have less than 10 ppm of a metal selected from the group consisting of aluminum, calcium, chromium, copper, iron, magnesium, sodium, nickel, silicon, titanium, zinc, and combinations thereof. In other instances the polyimide can have no detectable metals.

The purified polyimide can have an amount of an anion selected from the group consisting of chloride, bromide, sulfates, phosphates, and combinations thereof, wherein the amount is within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 ppm. For example, the purified polyimide can have less than 20 ppm of an anion selected from the group consisting of chloride, bromide, sulfates, phosphates, and combinations thereof. In other instances the polyimide can have no detectable anions.

The purified polyimide, when held at 360 degrees Celsius for 30 minutes at 10 radians/second, can have a change in melt viscosity, as measured by ASTM D4440, that is a percentage of the melt viscosity of the initial polyetherimide. The percentage can be within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, and 25%. For example, the purified polyimide, when held at 360 degrees Celsius for 30 minutes at 10 radians/second, can have a change in melt viscosity, as measured by ASTM D4440, of less than 10% of the melt viscosity of the initial polyetherimide. This indicates that the resultant purified resin has very good melt stability and is suitable for further melt processing into, film fiber, sheet or molded parts.

A polyimide that is purified according to our invention can be a polyetherimide sulfone for example as described in U.S. Pat. No. 7,041,773, which is hereby incorporated in its entirety.

The volatile species can have a molecular weight within a range having a lower limit and/or an upper limit. The range can include or exclude the lower limit and/or the upper limit. The lower limit and/or upper limit can be selected from 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, and 350 Daltons. For example, the volatile species can have a molecular weight below 250 Daltons.

The volatile species can be selected from the group consisting of aryl compounds, aprotic polar compounds, and combinations thereof.

The volatile species can be an aryl compound selected from the group consisting of toluene, xylenes, naphthalene, chloro benzene, dichlorobenzenes, trichlorobenzenes, anisole, veratrole, cresols, phenol, xylenols, diphenyl sulfones, diphenyl ethers, benzonitrile, and combinations thereof.

The volatile species can be an aprotic polar compound selected from the group consisting of dimethyl formamide, N-methylpyrrolidinone, dimethyl sulfoxide, formamide, sulfolane, acetamide, and combinations thereof.

The volatile species can have a polarity index within a range having a lower limit and/or an upper limit. The range can include or exclude the lower limit and/or the upper limit. The lower limit and/or upper limit can be selected from 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, and 4. For example, the volatile species can have a polarity index greater than 2.3.

In other instances the volatile species can have a molecular weight within a range having a lower limit and/or an upper limit. The range can include or exclude the lower limit and/or the upper limit. The lower limit and/or upper limit can be selected from 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 Daltons. For example, the volatile species can have a molecular weight below 650 Daltons.

The volatile species can be selected from the group consisting of phosphates, phosphites, and combinations thereof.

The extruder can be of any conventional type, for example either single or twin screw with any screw design provides that it allows for the injection of water or steam and subsequent removal of steam containing impurities from the polymer. In a preferred embodiment the extruder is a co-rotating twin screw extruder. In other instances the extruder will have a length to diameter (L/D) of from 5:1 to 50:1. In other instances the L/D will be from 20:1 to 40:1. In yet other instances the extruder diameter will vary from 0.5 to 8.0 inches. The extruder can be run at any conventional speed, for example from 50 to 400 revolutions per minute (rpm). The initial polyetherimide (PEI) can be fed to the extruder in any form, for example, pellets, cubes, flakes, chunks, powder or any mixture thereof. In some instances the PEI can be fed into the extruder with water. In a preferred embodiment the water or steam used to purify the PEI will be deionized and have less that 1 ppm metal cations in other instances the water will meet the ASTM D1193 type I requirement.

Our purified polyimide resin can be used in a variety of applications, for example films for electrical devices, computer applications such as computer hard drives, electronic storage devices, flexible circuits, sensors, chip carriers, burn in test sockets (BITS), motors, generators, wire coatings, connectors and the like.

Advantageously, our invention can now provide polyetherimides and other polyimides having low residuals and excellent molecular weight retention properties. Our invention can provide a highly effective process for improving the quality of polyetherimides or other polyimides by certain steam conditions. Advantageously, the polyimide polymer made with our process, does not undergo chain scission to lose appreciable molecular weight, as is often observed when a polyimide such as polyetherimides is exposed to water/steam and high temperatures.

EXAMPLES

The following examples illustrate the present invention, but are not meant to be limitations to the scope thereof.

Numbers designate examples of the invention, comparative examples are designed by letters.

Materials

Table 1 provides a listing of materials used in the Examples.

TABLE 1

| Material | Description | CAS Number | Vendor |
| --- | --- | --- | --- |
| U1010 | ULTEM 1010 a polyetherimide of bisphenol-A dianhydride and m-phenylene diamine capped with phthalic anhydride, Mw ~44K | 61128-46-9 | SABIC Innovative Plastics |

Techniques & Procedures

A sample of ULTEM 1010 polyetherimide (PEI) resin pellets (See Table 1) were melt processed on a co-rotating twin screw extruder with water injection and steam removal in a vented mixing screw, at a barrel set temperature between 270 and 320° C. and 450 rpm screw speed. The screws design of the COPERION® 2 Lobe ZSK30 mm co-rotating twin screw extruder 100 as shown in FIG. 1. The extruder 100 included an atmospheric vent 101 through its side feeder, a water inlet 102 and a vacuum vent 103. Extrusion conditions are shown in Table 2.

The resin was not pre-dried. Water was injected into the molten PEI resin at about the $9^{th}$ barrel section. As the water was subsequently mixed with the molten resin it was converted into steam. The steam and volatile impurities were then vented from the extruder at about the $10^{th}$ barrel section as shown in FIG. 1. It is believed that the phenomenon of steam distillation helped to remove some of the impurities. The extrudate was cooled through a water bath prior to pelletizing. Control Example A is the un-extruded resin, control Example B is extruded resin with no steam stripping. Examples of the invention 1, 2 and 3 are the first, second and third pass through the steam stripping twin screw extruder (Table 2). The pellets were tested for residual organic and ionic impurities. Rheological properties were also measured.

TABLE 2

| Examples | Description |
| --- | --- |
| A | Ultem 1010 polyetherimide from SABIC Innovative Plastics |
| B | Sample A extruded with no water addition |
| 1 | Sample A extruded with water/ steam addition |
| 2 | Sample 1 extruded with water/ steam addition |
| 3 | Sample 2 extruded with water/steam addition |

| Extrusion Conditions | |
| --- | --- |
| Temp. Profile: | 270° C. in feed zone increasing to 315° C. in final zone, 320° C. at die |
| Feed Rate: | 25 lb/hr |
| Screw Speed: | 450 rpm |
| Vacuum Vent: | 24 in. Hg vacuum |
| Water rate: | 0.38 lb/hr |
| Melt Temp. at die: | 403° C. |

Test Procedures

Technique/Procedure For Determining Melt Flow

Melt flow (MVR) was run on dried pellets as per ASTM D1238 at 337° C. using a 6.7 Kg weight. MVR was measured as cc/10 minutes. Higher values indicate higher melt flow and lower viscosity. Viscosity vs. time, also known as melt dwell (MV Dwell) or time sweep, was run using a parallel plate fixture rheometer at 360° C. for 30 minutes at 10 radians/sec. under nitrogen as per ASTM D4440. Viscosities at the onset (after a 6 minute equilibration) and at the end of the test (30 minutes after equilibration) were compared to show the relative stability of the molten polymer. Viscosity was measured as Pascal seconds (Pa-s).

Technique/Procedure for Determining Molecular Weight

Molecular weight was measured by gel permeation chromatography (GPC) as per ASTM method D5296. Molecular weight is reported as both weight average (Mw) and number average (Mn) molecular weight. Polydispersity index (PDI) is the ratio of Mw to Mn. Polystyrene standards were used for calibration.

Technique/Procedure for Determining Glass Transition Temperature

The glass transition temperature (Tg) was measured using differential scanning calorimetry (DSC) as per ASTM method D3418 at a 20° C./min. heating rate. Tg was recorded on the second heat.

Technique/Procedure for Determining o-Dichlorobenzene Residual Content o-Dichlorobenzene (oDCB) content was determined using a gas chromatography method. The PEI pellet samples were dissolved in mixture of hexafluoro-isopropanol (HFIP) and chloroform. The solutions were directly injected into the gas chromatograph.

Technique/Procedure for Determining Residual Anion Content

Total anion content of the samples was done by digestion of the sample by oxidation followed by ion chromatography (IC). Oxidation was done by sample combustion in a Parr bomb vessel. Parr oxygen combustion vessel is a closed system where the sample is ignited by an electrical source in the presence of oxygen. The sample is converted into dilute acids, water and carbon dioxide. The combusted sample was dissolved in water and measured for anions by IC. The following procedure was employed. About 800 mg of the sample was weighed into the capsule. The vessel was filled with 15 mL of water. The fuse wire was connected so that it contacted the sample but not the capsule. The vessel was filled with about 30 bar oxygen. The sample was ignited for approximately 6 seconds and the vessel is shaken for about 9 minutes. Pressure was released and the sample was washed with high purity water and analyzed by ion chromatography using a Dionex ICS-2000 Ion Chromatography instrument.

Techniques & Procedures for Determining Metal Content

Metal content was determined by weighing about 0.5 g to 1.0 g of resin sample into a 250 ml Teflon beaker; adding about 10 ml of concentrated hydrochloric acid and 3 ml of concentrated nitric acid; and heating the mixture with PEI resin slowly on a hot plate. Once the sample dissolved, it was diluted with 50 ml of high purity water and analyze by Inductively Coupled Plasma-Optical Emission Spectrometry.

Techniques & Procedures for Determining Concentrations of Ions in the Sample

The following equation to determine the concentrations of each ion present in the samples:

$$\frac{(\mu g/mL \text{ ion from sample} - \text{blank}) \times (\text{sample dilution})}{\text{sample weight (in grams)}} = \mu g/gram \text{ (ppm) ion}$$

Technique/Procedure for Determining Hydrolysis

Hydro aging of U1010 was done in an NAPCO Series E model 8100-TD autoclave test chamber at 125° C. on molded tensile bars. Deionized water was used as the steam source. Samples were patted dry with a paper towel and a GPC sample was cut from the bar. Samples were suspended in racks and did not sit in liquid water at any time. Aging was done for up to 60 days, a small sample of the bar was cut off and analyzed by GPC as per ASTM D5296.

Results

Table 3 shows a comparison of the un-extruded resin (control Example A) and the resin extruded with no water/steam injection (control Example B) to the same resin, processed in the same extruder, with injection of water/steam (Example 1).

TABLE 3

| | Example | | | | |
|---|---|---|---|---|---|
| | A | B | 1 | 2 | 3 |
| Sample | Unextruded PEI | Extruded No Steam | Steam first pass | Steam second pass | Steam third pass |
| oDCB (ppm) | 383 | 44 | 11 | <5 | <5 |
| triaryl phosphite (ppm) | 147 | 37 | 23 | <10 | <10 |
| PAMI (ppm) | 337 | 312 | 305 | 283 | 262 |
| GPC (Mw) | 46650 | 46051 | 45746 | 45335 | 45210 |
| GPC (Mn) | 20718 | 20088 | 20225 | 19785 | 20256 |
| PDI | 2.25 | 2.29 | 2.26 | 2.29 | 2.23 |
| % Mw retention vs. Example A | n/a | 98.7% | 98.1% | 97.2% | 96.9% |
| MVR, 367° C./6.7 kg (cc/10 min) | 15.1 | 15.2 | 16.0 | 16.6 | 17.2 |
| Tg DSC (° C.) | 218.7 | 218.6 | 218.6 | 217.8 | 218.3 |
| Initial MV at 360° C. (Pa-s) | 8753 | 8694 | 8468 | 8318 | 8070 |
| MV 30 min at 360° C. (Pa-s) | 8753 | 8715 | 8654 | 8666 | 8377 |
| % change 30 min. MV Dwell | 0% | 0.2% | 2.2% | 4.2% | 3.8% |

Discussion

The use of steam stripping molten polyetherimides resulted in a polymer that exhibited a combination of both low residual amounts and excellent molecular weight retention. More particularly, the steam stripped resin of Example 1 was further extruded a second time (Example 2) and a third time (Example 3) each time with injection of water/steam to further purify the PEI resin.

The un-extruded resin (control Example A) had 383 ppm o-dichlorobenzene (oDCB), a residual aromatic solvent from polymerization; it also had 147 ppm of a tris aryl phosphite, (tris di-t-butyl phenyl phosphite). The PEI resin also had 337 ppm of the bis phthalimide of m-phenylene diamine (PAMI). A standard extrusion ran at very high melt temperature (about 400° C.) with vacuum applied, Example B, reduced the level of oDCB to 44 ppm, the phosphite to 37 ppm and the PAMI to 312 ppm. This reduction is beneficial in some instances, but further reduction was needed.

Running the same resin under the same conditions but with steam stripping of the invention (Example 1) oDCB is reduced to 11 ppm, phosphite to 23 ppm and PAMI to 305 ppm. A second pass through the extruder with steam stripping reduces oDCB and phosphite to non-detectable limits (less than 5 and 10 ppm respectively). PAMI is reduced to less than 300 ppm.

It was very surprising that in the presence of water/steam at such high temperature (about 400° C.) that the PEI resin did not undergo chain scission to lose appreciable molecular weight. GPC analyses show that for even after three contacts with steam (Example 3) the PEI resin has over 96% of its original Mw. Since PEI is a condensation polymer, made by elimination of water, it was surprising that under the very extreme conditions of steam stripping, that Mw was still retained to such a high percent. The PEI resin of Examples 1, 2, and 3 also showed only a small shift in melt viscosity vs. control Example B, with MVR values of 16.0, 16.6, and 17.2 cc/10 min at 337° C. vs. control B with a MVR of 15.2 cc/10 min.

The purified PEI resins also had a glass transition temperature (Tg) of above 200° C. In addition the purified resins of Examples 1, 2, and 3 showed very good melt stability, when heated for 30 min. at 360° C. in the MV dwell test the show less than a 5% change from the initial melt viscosity before steam stripping. The PEI resin of Examples 1 to 3 had an amine end group content below 40 ppm. The purified resins 1 to 3 also have phenolic end group content below 40 ppm.

The samples were analyzed for metals by ICP (inductively coupled plasma-optical emission spectrometry) and for anion content by ion chromatography. The results are presented in Table 4. The Examples 1, 2, and 3 all show a very low level of metals in most instances below 10 ppm. In addition, chloride, aluminum, calcium, and phosphorous are reduced vs. the control Examples A and B.

TABLE 4

| | Example | | | | |
|---|---|---|---|---|---|
| | A | B | 1 | 2 | 3 |
| Sample | Unextruded PEI | Extruded No Steam | Steam 1st Pass | Steam 2nd Pass | Steam 3rd Pass |
| Aluminum (ppm) | 3.5 | 1.5 | 1.4 | 1.2 | 1.0 |
| Calcium (ppm) | 3.0 | 2.1 | 1.7 | 1.8 | 1.7 |
| Chromium (ppm) | 0.6 | 0.9 | 0.6 | 0.6 | 0.7 |
| Copper (ppm) | 0.0 | 0.0 | 0.0 | 0.0 | 0.1 |
| Iron (ppm) | 4.4 | 5.4 | 4.8 | 5.9 | 6.2 |
| Magnesium (ppm) | 0.3 | 0.0 | 0.1 | 0.0 | 0.0 |
| Sodium (ppm) | 1.4 | 1.4 | 2.0 | 2.5 | 2.3 |
| Nickel (ppm) | 0.6 | 0.8 | 0.7 | 0.7 | 0.7 |
| Silicon (ppm) | 1.5 | 2.6 | 1.6 | 1.1 | 1.2 |
| Titanium (ppm) | 0.1 | 0.0 | 0.2 | 0.1 | 0.2 |
| Zinc (ppm) | 0.6 | 0.5 | 1.1 | 2.4 | 2.0 |
| Phosphorous (ppm) | 20.0 | 14.3 | 12.9 | 13.0 | 11.9 |
| Chloride (ppm) | 220 | 36 | 11 | 10 | 11 |

Our results show that when the polyetherimide was exposed to steam conditions in accordance to our invention, the polyetherimide exhibited low residuals. For instance, the polyetherimide had a phosphorus content of 13 ppm or less. The combined amount of aluminum, calcium, chromium, copper, iron, magnesion, sodium, nickel, silicon, titanium, zinc, phosphorous, and chloride for the results obtained for Examples 1, 2, and 3 were 38.1, 39.3, and 39 ppm, respectively-substantially less that the amounts obtained for Comparative/Reference Examples A (256 ppm) and B (65.5 ppm)

Comparative Examples

The purpose of the following Comparative Examples was to measure the effect of exposing polyetherimide to aqueous conditions. Polyetherimide (U1010) was exposed to steam at 125° C. for various durations. The results are presented in Table 5.

TABLE 5

| Example | Exposure Time | Mw Retention % | Mw |
|---------|---------------|----------------|-------|
| U1010   | 0 Days        | Start          | 47532 |
| C       | 20 Days       | 89.3%          | 42424 |
| D       | 33 Days       | 85.4%          | 40599 |
| E       | 45 Days       | 84.2%          | 40040 |
| F       | 60 Days       | 75.0%          | 35640 |

Discussion

The results presented in Table 5 show that the exposure of polyetherimide to steam conditions at the indicated conditions reduced the molecular weight of the polyetherimide more than 10%, an unacceptable amount.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. A process comprising contacting an initial polyimide selected from the group of polyetherimide homopolymers, polyetherimide copolymers, and combinations thereof, with steam to remove a volatile species from the initial polyimide to produce a purified polyimide,
wherein the purified polyimide has a weight average molecular weight of from 5,000 to 80,000 Daltons, and
wherein the weight average molecular weight of the purified polyimide is greater than or equal to 90% of the weight average molecular weight of the initial polyimide.

2. The process of claim 1, wherein the initial polyimide is in a molten state during the contacting with steam.

3. The process of claim 1 further comprising passing the purified polyimide in a molten state through a filter to remove particles having a particle size ranging from 20 to 80 microns.

4. The process of claim 1, wherein the purified polyimide has less than 20 ppm of o-dichlorobenzene.

5. The process of claim 1, wherein the purified polyimide has a glass transition temperature (Tg) in a range of from 200 to 280 degrees Celsius.

6. The process of claim 1, wherein the purified polyimide has a polydispersity index (PDI) of less than or equal to 2.5.

7. The process of claim 1, wherein the purified polyimide has a phenolic end group concentration below 40 ppm.

8. The process of claim 1, wherein the purified polyimide has less than 10 ppm of a metal selected from the group consisting of aluminum, calcium, chromium, copper, iron, magnesium, sodium, nickel, silicon, titanium, zinc, and combinations thereof.

9. The process of claim 1, wherein the purified polyimide has less than 20 ppm of an anion selected from the group consisting of chloride, bromide, sulfates, phosphates, and combinations thereof.

10. The process of claim 1 wherein the purified polyimide, when held at 360 degrees Celsius for 30 minutes at 10 radians/second, has a change in melt viscosity, as measured by ASTM D4440, of less than 10% of relative to the melt viscosity of the initial polyimide.

11. The process of claim 1, wherein the purified polyimide is a polyetherimide sulfone.

12. The process of claim 1, wherein the volatile species has a molecular weight below 250 Daltons.

13. The process of claim 1, wherein the volatile species is selected from the group consisting of aryl compounds, aprotic polar compounds, and combinations thereof.

14. The process of claim 1, wherein the volatile species is an aryl compound selected from the group consisting of toluene, xylenes, naphthalene, chloro benzene, dichlorobenzenes, trichlorobenzenes, anisole, veratrole, cresols, phenol, xylenols, diphenyl sulfones, diphenyl ethers, benzonitrile, and combinations thereof.

15. The process of claim 1, wherein the volatile species is an aprotic polar compound selected from the group consisting of dimethyl formamide, N-methylpyrrolidinone, dimethyl sulfoxide, formamide, sulfolane, acetamide, and combinations thereof.

16. The process of claim 1 wherein the volatile species has a polarity index greater than 2.3.

17. The process of claim 1 wherein the volatile species has a molecular weight below 650 Daltons.

18. The process of claim 1, wherein the volatile species is selected from the group consisting of phosphates, phosphites, and combinations thereof.

19. A steam stripping process for producing a purified polyetherimide from an initial polyetherimide comprising:
a) melting the initial polyetherimide at above 300 degrees Celsius in an extruder to produce a molten polyetherimide;
b) contacting the molten polyetherimide with steam for a time period less than or equal to 10 minutes;
c) allowing the steam and any volatile species to escape from the extruder through a vent disposed thereon;
d) passing the molten polyetherimide through a die to form the purified polyetherimide;
e) cooling the purified polyetherimide to a temperature in a range less than or equal to a glass transition temperature of the purified polyetherimide; and
f) chopping the purified polyetherimide into pellets,
wherein the purified polyetherimide has a weight average molecular weight that is in a range of from 5,000 to 80,000 Daltons, and that is at least 90% of the weight average molecular weight of the initial polyetherimide.

20. A polyetherimide having a weight average molecular weight of from 5,000 to 80,000 Daltons, wherein the polyetherimide comprises less than 44 ppm of a volatile species, the volatile species having a molecular weight of less than 250 Daltons and being selected from the group consisting of aryl compounds, aprotic polar compounds, and combinations thereof, the polyetherimide having a phosphorus content of 13 ppm or less.

21. The polyetherimide of claim 20, wherein the polyetherimide has a glass transition temperature (Tg) in a range of from 200 to 280 degrees Celsius.

22. The polyetherimide of claim 20, wherein the polyetherimide has a polydispersity index (PDI) of less than or equal to 2.5.

23. The polyetherimide of claim 20, wherein the polyetherimide has a phenolic end group concentration below 40 ppm.

24. The polyetherimide of claim 20, wherein the polyetherimide has less than 10 ppm of a metal selected from the group consisting of aluminum, calcium, chromium, copper, iron, magnesium, sodium, nickel, silicon, titanium, zinc, and combinations thereof.

25. The polyetherimide of claim 20, wherein the polyetherimide has less than 20 ppm of an anion selected from the group consisting of chloride, bromide, sulfates, phosphates, and combinations thereof.

26. The polyetherimide of claim 20, wherein the purified polyetherimide is a polyetherimide sulfone.

27. A polyetherimide having a weight average molecular weight of from 5,000 to 80,000 Daltons,
wherein the polyetherimide is a purified polyetherimide and the polyetherimide comprises less than 44 ppm of a volatile species, the volatile species having a molecular weight of less than 250 Daltons and being selected from the group consisting of aryl compounds, aprotic polar compounds, and combinations thereof, and 13 ppm or less of phosphorous,
wherein the polyetherimide is made by a steam stripping process comprising:
a) melting the initial polyetherimide at above 300 degrees Celsius in an extruder to produce a molten polyetherimide;
b) contacting the molten polyetherimide with steam for a time period less than or equal to 10 minutes;
c) allowing the steam and any volatile species to escape from the extruder through a vent disposed thereon;
d) passing the molten polyetherimide through a die to form the purified polyetherimide;
e) cooling the purified polyetherimide to a temperature in a range less than or equal to a glass transition temperature of the purified polyetherimide; and
f) chopping the purified polyetherimide into pellets,
wherein the purified polyetherimide has a weight average molecular weight that is in a range of from 5,000 to 80,000 Daltons, and that is at least 90% of the weight average molecular weight of the initial polyetherimide.

28. A process comprising contacting an initial polyetherimide with steam to remove a volatile species from the initial polyetherimide to produce a purified polyetherimide, the volatile species selected from the group of aryl compounds, aprotic polar compound, and combinations thereof, said aryl compounds selected from the group consisting of toluene, xylenes, naphthalene, chloro benzene, dichlorobenzenes, trichlorobenzenes, anisole, veratrole, cresols, phenol, xylenols, diphenyl sulfones, diphenyl ethers, benzonitrile, and combinations thereof, said aprotic polar compound being selected from the group consisting of dimethyl formamide, N-methylpyrrolidinone, dimethyl sulfoxide, formamide, sulfolane, acetamide, and combinations thereof;
wherein the purified polyetherimide has a weight average molecular weight of from 5,000 to 80,000 Daltons, and
wherein the weight average molecular weight of the purified polyetherimide is greater than or equal to 90% of the weight average molecular weight of the initial polyetherimide;
wherein the polyetherimide has less than 10 ppm of a metal selected from the group consisting of aluminum, calcium, chromium, copper, iron, magnesium, sodium, nickel, silicon, titanium, zinc, and combinations thereof; and
the polyetherimide has less than 20 ppm of an anion selected from the group consisting of chloride, bromide, sulfates, phosphates, and combinations thereof.

29. The polyetherimide made by process of claim 28.

* * * * *